May 10, 1960   C. N. WHITE ET AL   2,936,371
MEASURING VELOCITY OF TRANSPORTED MATERIAL
Filed Nov. 5, 1956
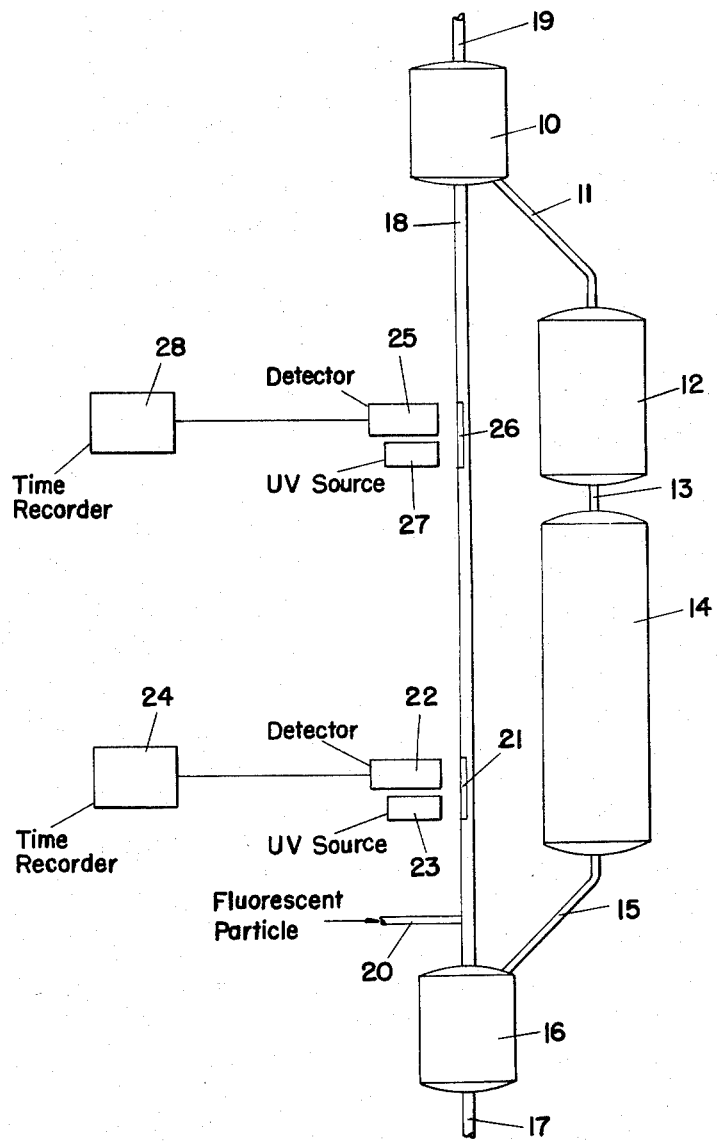
INVENTOR.
CHESTER N. WHITE
HENRY L. BACHOFER
BY
ATTORNEY

United States Patent Office 2,936,371
Patented May 10, 1960

2,936,371

MEASURING VELOCITY OF TRANSPORTED MATERIAL

Chester N. White, Ridley Park, and Henry L. Bachofer, Springfield, Pa., assignors to Sun Oil Company, Philadelphia, Pa., a corporation of New Jersey Application November 5, 1956, Serial No. 620,540

10 Claims. (Cl. 259—71)

This invention relates to the measurement of velocity of material transported through a confined zone defining a path of travel.

In the transportation of material through conduits, it is frequently desired to measure the average velocity of the material during its passage through the conduit. Such measurement often is not easily accomplished without interfering to some extent with the transportation of the material or with some operation in which the material is involved subsequent to the transportation operation.

The present invention provides a novel manner of measuring the velocity of transported material, e.g. fluid material or solid granular material, without interfering with the transportation or subsequent operations. This is accomplished according to the invention by introducing a light-emitting substance into the material being transported, and detecting the light emitted from the substance at a subsequent stage or stages of the transportation, the time and distance traveled being measured to permit a calculation of velocity.

Thus, in one embodiment, a luminescent, i.e. light-emitting, substance is introduced at a point A in a conduit for transporting material, and is carried with the transported material past a point B downstream from A and a point C downstream from A and B. Light emitted from the substance is detected as it passes point B and later as it passes point C. The time interval between the two detections is determined, and from this interval and the distance between B and C, the velocity of the luminescent substance can be calculated.

The natures of the transported material and of the luminescent substance respectively are preferably such that both are transported between points B and C at the same or nearly the same velocity, so that determination of the velocity of the luminescent substance provides directly a measure of the velocity of the transported material. Otherwise, a correlation must be made beforehand of the relationship between the respective velocities, and operation involving such correlation, though within the scope of the invention, is preferably avoided.

Thus, in the case of granular solids being elevated through a lift conduit by means of a lifting gas for example, it is preferred that the luminescent material have approximately the same size, shape and density as the solids whose velocity is desired to be measured, so that the velocity of the luminescent material is nearly the same under given lifting conditions as that of the solids transported. Where the solids transported differ among themselves in characteristics affecting velocity, the luminescent material provides a measure of the velocity of those particles in the mixture of solids which most closely resemble in those characteristics the luminescent materials. By employing a plurality of luminescent materials in separate tests wherein the characteristics affecting velocity, e.g. size, shape, density, are varied in the luminescent material from test to test, a relationship can be determined between the various characteristics of the particles in the solids mixture and the velocity of the particles under given lifting conditions.

The desired characteristics in the luminescent material for a given test can be obtained by the proper choice of components of the luminescent material. As an example, where a silica-alumina cracking catalyst having particle size of about 6 mesh on the U.S. sieve series scale is the material whose velocity it is desired to determine, a suitable luminescent material can be prepared by coating one of the catalyst particles to be transported with a luminescent paint to obtain a luminescent particle having approximately the same size, shape and density as the material whose velocity it is desired to determine. A typical composition of a luminescent paint is given in P. L. Gordon et al., "Paint and Varnish Manual," page 128 (1955). Alternatively, in such instance, a suitable luminescent material can be prepared by adding a luminescent component during the preparation of a catalyst particle in a manner otherwise the same as the preparation of the particles whose velocity is to be determined. In this manner, the luminescent component becomes an integral part of the catalyst particle which is to be used as the luminescent material in the process according to the invention.

The luminescent material is introduced as a discrete amount into the material whose velocity is to be measured, in order that an accurate determination can be made of the time required for the luminescent material to pass between two points in the path of travel. For example, a single luminescent particle can be introduced into a mixture of nonluminescent particles which are being transported. Detection of light emission at subsequent points in the path of travel provides an accurate determination of the time interval. Where, on the other hand, a plurality of luminescent particles are introduced at the same point substantially simultaneously, the detection of light emission at subsequent points will generally persist over a longer period of time and give a range or distribution of velocities, rather than a single determination. Such range or distribution of velocities is desirable information in many instances, so this manner of operation is often advantageous.

The method according to the invention can be employed even where the material transported is itself luminescent, provided that the luminescent material which is added has a different intensity of light emission from the material being transported. In such cases, the passage of the added substance past points B and C for example may be indicated by an increase in intensity of the light detected at those points.

It is necessary that the light emitted by the luminescent material be transmitted to the detector. Therefore, the path of travel of light from the luminescent material to the detector must be sufficiently free of obstruction to permit the detection. Where the material being transported does not transmit sufficiently the emitted light, it is necessary that the path of travel of the emitted light be sufficiently free of the material being transported to permit passage of the light to the detector. Where the luminescent material, as it passes point B for example, is sufficiently near a translucent or transparent portion of the conduit wall, the detector being positioned exteriorly of the conduit and adjacent that portion of the wall, suitable transmission of light to the detector is provided. On the other hand, even when the luminescent material is in a central portion of the conduit cross section as it passes point B, sufficient transmission is provided if the concentration of the transported material in the conduit is sufficiently low, the transporting medium is a transmitter of light, and the path between the luminescent material and the detector is sufficiently free of particles of the transported material.

Thus, for example, where solid particles are transported by means of air as lifting gas, in a suspension containing about 10 volume percent of solids, the lift conduit having for example diameter of about 8 inches, it is unlikely that light emitted from a luminescent particle, even if the latter is travelling along the longitudinal axis of the lift conduit, will be blocked by other particles in all possible paths from the luminescent particle to the detector within the field scanned by the detector.

Preferably, where solid particles are transported, the concentration of solids in the conduit is preferably less than 50 volume percent, and more preferably less than 25 volume percent, in order to provide sufficient transmission of light to the detector. In cases where the concentration is greater, it is generally necessary that the luminescent particle or particles be near the wall of the conduit while passing by the detector.

The light emitted by the luminescent material can be infrared, visible or ultraviolet light, and has for example wave length within the approximate range from 0.0001 to 0.001 millimeter, more preferably 0.00025 to 0.00035 millimeter. The luminescent material can for example be fluorescent or phosphorescent, exciting radiation being provided where necessary.

In one embodiment, a light emitting material is employed which is undergoing combustion during its passage within the field scanned by the detector. Thus, for example, in a lifting operation for granular solids wherein the temperature in the lifting zone is sufficiently high to support combustion, a solid combustible particle, e.g. wood, carbon, etc. having suitable size, shape and density, is used as the light emitting material, being introduced into the conduit at a location such that it is burning while within the field of the detector. If there is not sufficient oxygen normally in the conduit, an oxygen supplying material such as barium peroxide, potassium perchlorate, etc., can be associated with the combustible material in order to provide oxygen for combustion.

In one embodiment, a light emitting material is employed which, though not burning, is at a higher, temperature than the material being transported and consequently emits infrared radiation of greater intensity than that emitted by the material being transported. In this case, a detector for infrared radiation is employed to make the velocity determination.

It is preferred according to the invention that at least two detectors be used, the one nearest the point of introduction of the luminescent material being nevertheless far enough from that point to permit the luminescent material to reach its typical velocity before entering the field scanned by that detector. In cases where the time required to reach the typical velocity does not have a significant effect on the velocity calculation, a single detector can be used, the time interval measured being that between introduction of the luminescent material and entry into the field scanned by the detector.

The life of the luminescent material, i.e. the period of time during which the material continues to emit detectable radiation, is sometimes important. For example, where granular solids are circulated repeatedly through a process system, it is often desirable that the luminescent life be sufficiently short that the material will not emit detectable light during more than one passage past detecting apparatus in a given part of the system. This prevents a luminescent material from interfering with subsequent velocity determinations after its first passage past the detecting apparatus.

It is also important that the life of the luminescent material be sufficiently long to provide emission of detectable radiation during the first passage past the detecting apparatus. Preferably, the life is at least 5 seconds, in order to provide the necessary light emission during passage past the detecting apparatus. Where for any reason it is necessary to increase the life period of a luminescent material in an operation involving high temperatures in the presence of oxygen, this can be accomplished for example by using fire retardant coatings, e.g. of sodium silicate, sodium bicarbonate, calcium chloride, etc., on the material to inhibit burning of the luminescent components. Alternatively, or in addition, the luminescent material can be chilled prior to introduction into the conduit, as by contact with Dry Ice, etc., in order to decrease the rate of vaporization or combustion of luminescent components.

The invention will be further described with reference to the attached drawing, which is a schematic diagram of a system for circulating granular solids with pneumatic elevation in one part of the system and measurement of velocity according to the invention during such elevation.

Referring to the drawing, a system for circulating granular solids is illustrated. This system will be described with reference to a process for catalytic cracking of petroleum using solid granular cracking catalyst, e.g. acid-activated clay cracking catalyst. A typical size distribution for such catalyst, as introduced into the system, is as follows:

| Weight percent | Mesh range (U.S. sieve series) |
|---|---|
| 1.2 | Larger than 4. |
| 76.2 | 4 to 6. |
| 16.7 | 6 to 8. |
| 2.4 | 8 to 10. |
| 3.5 | Smaller than 10. |

During circulation of solids through the system, some attrition occurs, with resulting formation of smaller particles including fines of the order of 200 mesh and smaller. By periodic or continuous addition of fresh catalyst to the system, however, the bulk of the catalyst in the system is maintained within the size range, 4 to 6 mesh.

Catalyst gravitates as a compact mass from gas lift disengager 10 through line 11 into cracking reactor 12, wherein it contacts hydrocarbon cracking charge under cracking conditions to produce products having reduced average molecular weight. Catalyst then gravitates through line 13 into regenerator 14 where carbonaceous deposits are burned from the catalyst. Catalyst then gravitates through line 15 into gas lift engager 16. Lifting gas under pressure, e.g. flue gas or air, etc., is introduced through line 17 to form a suspension of catalyst particles in lifting gas. The gas containing suspended particles at a temperature of about 1150° F. then passes through lift conduit 18 into disengager 10. Lifting gas is separated from catalyst and withdrawn through line 19. The separated solids pass through line 11 again to begin another cycle.

A luminescent substance, e.g. a 4 to 6 mesh particle of activated clay cracking catalyst, to which a coating layer of zinc sulfide phosphor in polyvinyl alcohol as vehicle has been applied, is injected into conduit 18 through conduit 20, when it is desired to make a velocity measurement. The particle is accelerated by the rising lifting gas until, as it passes light-permeable, transparent or translucent window 21, its velocity is similar to that of other 4 to 6 mesh particles in the catalyst mixture being transported upwardly by means of lifting gas.

Light detecting apparatus 22, e.g. a photoelectric cell, photomultiplier tube, etc. is positioned adjacent window 21 and scans a field within conduit 18. A source 23 of ultraviolet radiation, e.g. a mercury vapor lamp adapted to emit light having wave length through the range from 3130 to 5461 Angstrom units, is also positioned adjacent window 21. Ultraviolet rays emitted from source 23 impinge upon the fluorescent particle as it passes window 21 and act as exciting radiation to cause the particle to emit a bluish-white fluorescent light. This light is transmitted through window 21 to detector 22 and causes the latter to produce electrical impulses proportional in intensity to the fluorescent radiation. These impulses actuate a timing device 24 to indicate the beginning of the measured time period. A filter is employed between detector 22 and window 21 to filter out ultraviolet light and thereby avoid the actuation of detector 22 by ultraviolet light emitted by source 23 and reflected to the detector.

Light detecting apparatus 25 is positioned adjacent window 26 and scans a field within conduit 18. A source 27 of ultraviolet radiation is employed similarly to source 23 at the lower level. Two separate timing devices 24 and 28 can be employed, or a common timing device connected to both photoelectric devices 22 and 25 can be employed, the impulse from the lower photoelectric device actuating the timer to indicate the beginning of the measured time period, and the impulse from the upper photoelectric device actuating the timer later to indicate the end of the measured period.

Division of the distance, e.g. 100 feet, between the two detectors 22 and 25 by the measured time period provides a typical velocity of a 4 to 6 mesh particle in the portion of the lift conduit between the two detectors.

Additional detectors can be provided at other levels along the height of the lift conduit, and variations in velocity during travel of solids through the lift conduit can be determined by use of such additional detectors.

The time required for travel of the fluorescent particle between the point of injection and detector 25 may be 4 seconds for example. The life of the fluorescent particle may be 6 seconds for example at 1150° F. At the end of this period, the fluorescence ceases, as a result of vaporization or burning of the fluorescent material from the coated particle. Thus, subsequent operations in which the catalyst is involved, and subsequent velocity determinations using other fluorescent particles are not interfered with.

It is within the scope of the invention to use particles which continue to emit light for long periods of time, or indefinitely. Where material is transported in a cyclic fashion, however, the emission of light preferably ceases after a period not greater than the average time required for a particle to make one circuit of the apparatus. Such times will vary widely depending on the system, and may be for example within the approximate range from 1 to 100 minutes. In the light of the present specification, a person skilled in the art can select suitable materials to obtain the desired life at the temperature involved. Temperatures in the range from room temperature to 1200° F. are most commonly encountered, though other temperatures are involved in some instances.

In a generally similar manner to that described in connection with the drawing, a poplar wood chip having the approximate shape of a one-eighth inch cube can be employed in a system where a solid granular catalyst having approximately the same size and density is elevated at about 1200° F. by means of air as lifting gas. The chip is injected at a location such that about 10 second for example are required for it to reach the level of the lower detector. After 8 seconds for example the chip begins to flame. 14 seconds after injection, it ceases flaming but glows, and continues to glow until 33 seconds after injection, the times given being exemplary. Prior to the cessation of glowing, the chip passes the level of the upper detector, and a velocity determination is obtained. In another instance, a cane fiber insulating material known by the trademark "Celotex" can be employed as a loosely packed one-eighth inch diameter sphere which begins flaming 2 seconds after injection and glows during the period from 6 to 14 seconds after injection, or as a tightly packed one-eighth inch diameter sphere which begins flaming 4 seconds after injection and glows during the period from 9 to 21 seconds. A person skilled in the art can, in the light of the present specification, determine suitable operating conditions for use of other combustible materials.

Any suitable luminescent material can be employed according to the invention, such as the various well known organic fluorescent dyes and luminescent inorganic compounds such as zinc, cadmium, mercury compounds, etc. Various examples of luminescent materials are given in R. E. Kirk et al., "Encyclopedia of Chemical Technology," volume 8 (1952), at pages 540 to 553. The luminescent material can be employed as a coating for a solid particle, or injected as a fluid, or introduced into a solid particle during preparation of the latter. In the latter operation, for example, powdered solid material can be admixed with a luminescent substance and the mixture pelleted according to well known procedures for pelleted catalyst manufacture.

In cases where elevated temperatures of the order of 750° F. to 1200° F. for example are employed, various compositions containing fluorescent material and an organic binder can be employed for coating solid particles for example, such compositions being known in the art of providing fluorescent coatings for electric discharge lamps. Examples of such compositions are given in H. R. Schoenfeldt United States Patent No. 2,619,472, issued November 25, 1952, J. T. Anderson et al. United States Patent No. 2,726,966, issued December 13, 1955, E. Lemmers United States Patent No. 2,366,270, issued January 2, 1945, G. A. Michael United States Patent No. 2,337,524, issued December 21, 1943, W. A. Roberts United States Patent No. 2,298,968, issued October 13, 1942, C. J. Calbick et al. United States Patent No. 2,252,552, issued August 12, 1941, and L. F. Britten et al. United States Patent No. 2,297,048, issued September 29, 1942.

The invention claimed is:

1. Process for measuring velocity of transported material which comprises: introducing a discrete amount of a luminescent substance into transported material comprising fluid material during transportation thereof; subjecting said luminescent substance to ultraviolet light; detecting light emitted from said luminescent substance at a locus in the path of travel spaced apart from the locus of said introducing measuring the time elapsed during passage of said luminescent substance through a fixed distance along the path of travel prior to said detecting, thereby to determine the velocity of said transported material.

2. Process according to claim 1 wherein light emitted from said luminescent substance is detected at two spaced loci in the path of travel, said fixed distance being the distance between said loci.

3. Process according to claim 1 wherein said transported material comprises a mixture of granular solids transported upwardly as a suspension in a lifting gas, and wherein said luminescent substance is a solid particle having similar size, shape and density to constituents of said mixture and having associated therewith an added lumienscent material.

4. Process according to claim 3 wherein said luminescent substance is a fluorescent substance.

5. Process according to claim 3 wherein said luminescent substance is a phosphorescent substance.

6. Process for measuring velocity of transported material which comprises: introducing a discrete amount of a combustible organic substance into transported material comprising fluid material during transportation thereof; subjecting said combustible organic substance to intense heat to emit light; subsequently detecting light emitted from said combustible organic substance at a locus in the path of travel spaced apart from the locus of said introducing; measuring the time elapsed during passage of said combustible substance through a fixed distance along the path of travel prior to said detecting, thereby to determine the velocity of said transported material.

7. Process according to claim 1 wherein the material whose velocity is measured is transported in a cyclic system, and the duration of emission of light from said luminescent substance is less than the time required for one cycle.

8. Process according to claim 1 wherein said transported material comprises a mixture of granular solids transported upwardly as a suspension in a lifting gas, said suspension containing less than 25 volume percent of solids.

9. Process according to claim 6 wherein said transported material comprises a mixture of granular solids transported upwardly as a suspension in air at a temperature within the approximate range from 750 to 1200° F., and wherein said combustible substance is a solid particle.

10. Process according to claim 1 wherein said transported material comprises a mixture of granular solids transported upwardly as a suspension in a lifting gas at a temperature of 750 to 1200° F., and wherein said luminescent substance is a solid particle having similar size, shape and density to solid constituents of said mixture and having a luminescent coating thereon which emits light when subjected to ultraviolet radiation, and wherein said mixture is subjected to ultraviolet radiation substantially simultaneously with said detecting, and wherein any reflected ultraviolet radiation is filtered from the radiation passing into the field scanned in said detecting.

References Cited in the file of this patent
UNITED STATES PATENTS

| | | |
|---|---|---|
| 2,453,456 | Piely | Nov. 9, 1948 |
| 2,599,975 | Carpenter | June 10, 1952 |
| 2,631,242 | Metcalf | Mar. 10, 1953 |
| 2,640,936 | Pajes | June 2, 1953 |
| 2,756,343 | Johnson | July 24, 1956 |
| 2,826,699 | Hull | Mar. 11, 1958 |
| 2,835,699 | Fries | May 20, 1958 |